United States Patent
Dyksterhouse

[11] Patent Number: 5,911,932
[45] Date of Patent: Jun. 15, 1999

[54] METHOD OF PREPREGGING WITH RESIN

[75] Inventor: Joel A. Dyksterhouse, Petoskey, Mich.

[73] Assignee: R. Charles Balmer, Royal Oak, Mich.

[21] Appl. No.: 08/890,574

[22] Filed: Jul. 9, 1997

[51] Int. Cl.⁶ .......................... B29C 70/16; B29C 70/20; B29C 70/52

[52] U.S. Cl. .................. 264/136; 264/137; 264/145; 264/171.13; 264/171.23; 264/174.24

[58] Field of Search ................................ 264/136, 288.8, 264/289.6, 324, 257, DIG. 65, 137, 145, 171.13, 171.23, 171.24

[56] References Cited

U.S. PATENT DOCUMENTS

| | | | |
|---|---|---|---|
| 924,555 | 6/1909 | Jenkins | 264/136 |
| 1,179,660 | 4/1916 | Sanders | 264/136 |
| 1,590,602 | 6/1926 | Taylor | 264/136 |
| 1,808,590 | 6/1931 | Andernach | 264/136 |
| 2,204,664 | 6/1940 | Clark | 264/136 |
| 2,324,645 | 7/1943 | Prehler | 264/136 |
| 2,452,761 | 11/1948 | Jesionowski | 264/DIG. 65 |
| 3,000,464 | 9/1961 | Watters | 264/136 |
| 3,273,987 | 9/1966 | Marzocchi et al. . | |
| 3,826,703 | 7/1974 | Russell | 264/324 |
| 3,829,545 | 8/1974 | Van Vlaenderen | 264/DIG. 65 |
| 3,839,072 | 10/1974 | Kearsey | 264/289.6 |
| 3,993,726 | 11/1976 | Moyer . | |
| 4,000,237 | 12/1976 | Roberts, Jr. | 264/136 |
| 4,151,238 | 4/1979 | Ziemek et al. | 264/DIG. 65 |
| 4,541,884 | 9/1985 | Cogswell et al. . | |
| 4,549,920 | 10/1985 | Cogswell et al. . | |
| 4,559,262 | 12/1985 | Cogswell et al. . | |
| 4,624,886 | 11/1986 | Cogswell et al. . | |
| 4,735,828 | 4/1988 | Cogswell et al. . | |
| 4,783,349 | 11/1988 | Cogswell et al. . | |
| 4,894,105 | 1/1990 | Dyksterhouse et al. | 264/136 |
| 4,917,847 | 4/1990 | Solomon | 264/DIG. 65 |
| 4,976,906 | 12/1990 | Nakasone et al. | 264/DIG. 65 |
| 4,990,207 | 2/1991 | Sakai et al. . | |
| 5,019,450 | 5/1991 | Cogswell et al. . | |
| 5,080,851 | 1/1992 | Flonc et al. | 264/324 |
| 5,145,615 | 9/1992 | Kim et al. | 264/257 |
| 5,196,152 | 3/1993 | Gamache et al. | 264/257 |
| 5,213,889 | 5/1993 | Cogswell et al. . | |
| 5,236,646 | 8/1993 | Cochran et al. . | |
| 5,268,136 | 12/1993 | Girard et al. | 264/DIG. 65 |
| 5,273,781 | 12/1993 | Shu | 264/324 |
| 5,424,388 | 6/1995 | Chen et al. | 264/257 |
| 5,482,667 | 1/1996 | Dunton et al. | 264/136 |
| 5,540,797 | 7/1996 | Wilson . | |
| 5,609,806 | 3/1997 | Walsh et al. . | |

FOREIGN PATENT DOCUMENTS 0 167 303 A1  1/1986  European Pat. Off. .
0 393 536 A3  10/1990  European Pat. Off. .

OTHER PUBLICATIONS

PCT International Application Publication No. WP 95/25000 (Published Sep. 21,1995).

Gibson, A.G., et al. "Impregnation technology for thermoplastic matrix composites," Composites Manufacturing vol. 3, No. 4, 1992, pp. 223–233.

Primary Examiner—Leo B. Tentoni
Attorney, Agent, or Firm—Harness, Dickey & Pierce, P.L.C.

[57] ABSTRACT

Disclosed is a process of forming a prepreg material having substantially no voids. According to the process of the invention, the reinforcing material is heated to a temperature above the temperature of the impregnating resin. The prepreg formed has substantially no voids and does not require lengthy consolidation when formed into useful articles.

25 Claims, 3 Drawing Sheets

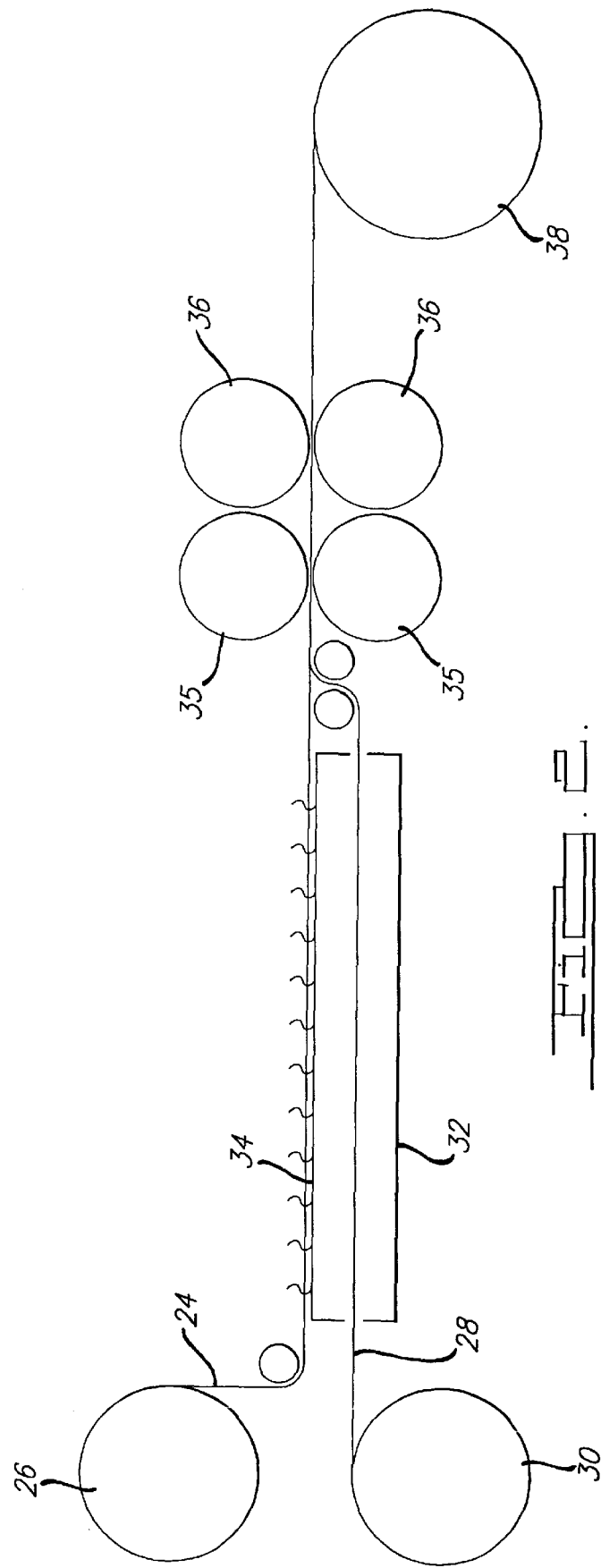

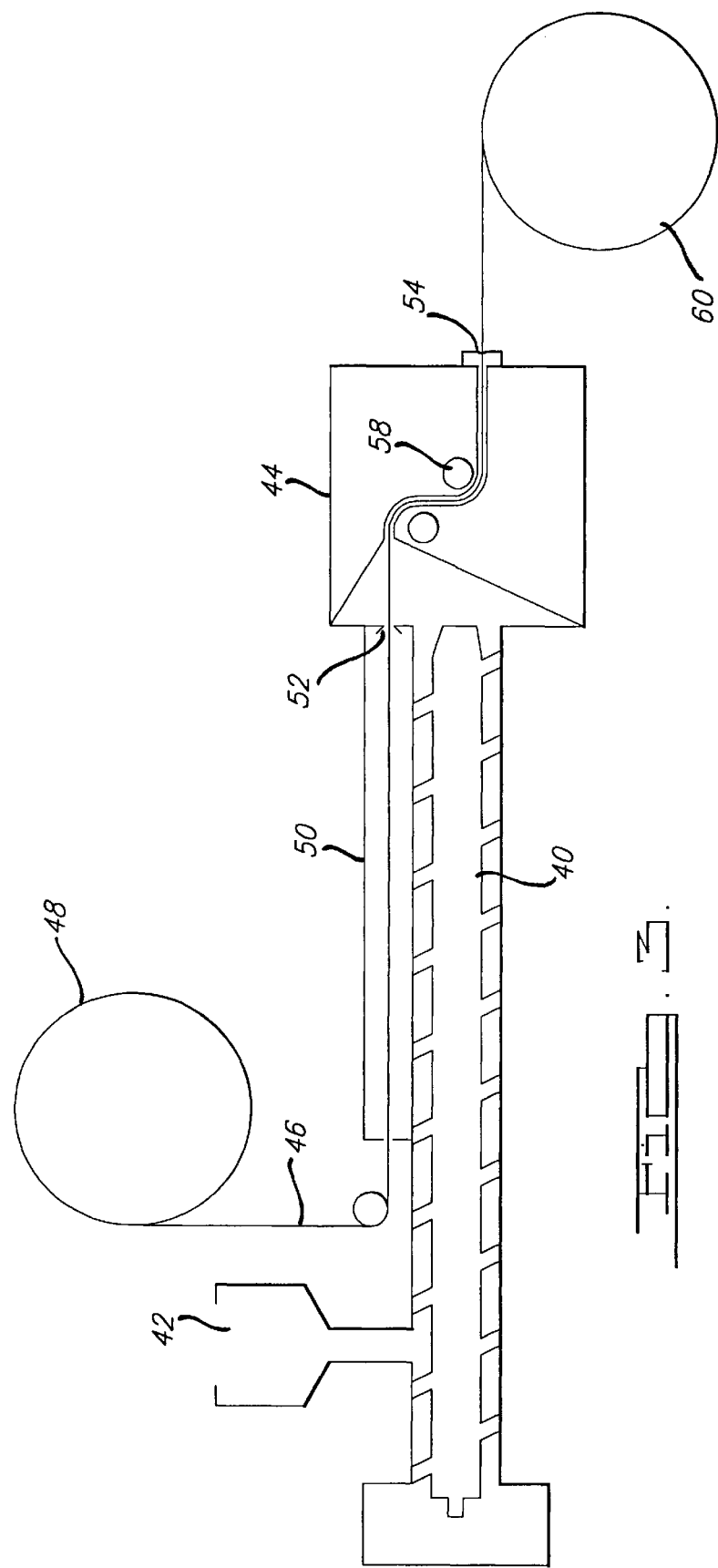

METHOD OF PREPREGGING WITH RESIN

FIELD OF THE INVENTION

The present invention relates to apparatus and method of prepregging materials such as fibers or other such reinforcements with resinous materials, especially with thermoplastic resin compositions. The invention further relates to prepregs produced by such apparatus or methods and to a method of using such prepregs to form articles having highly desirable properties.

BACKGROUND AND SUMMARY OF THE INVENTION

Reinforced thermoplastic and thermoset materials have wide application in, for example, the aerospace, automotive, industrial/chemical, and sporting goods industries. Thermosetting resins are impregnated into the reinforcing material before curing, while the resinous materials are low in viscosity. Thermoplastic compositions are more difficult to impregnate into the reinforcing material because of comparatively higher viscosities. On the other hand, thermoplastic compositions offer a number of benefits over thermosetting compositions. For example, thermoplastic prepregs are easier to fabricate into articles. Another advantage is that thermoplastic articles formed from such prepregs may be recycled. In addition, a wide variety of properties may be achieved by proper selection of the thermoplastic matrix.

Fiber-reinforced plastic materials are usually manufactured by first impregnating the fiber reinforcement with resin to form a prepreg, then consolidating two or more prepregs into a laminate, optionally with additional forming steps. Consolidation is typically necessary to remove voids that result from the inability of the resin to fully displace air from the fiber bundle, tow, or roving during the processes that have been used to impregnate the fibers with resin. The individually impregnated roving yarns, tows, plies, or layers of prepregs are usually consolidated by heat and pressure, or with heat and vacuum as by vacuum-bag molding and compacting in an autoclave. The consolidation step has generally required the application of very high pressures or vacuums at high temperatures and for relatively long times.

In the past, a thermoplastic composition has typically been heated, slurried, commingled, or diluted with solvents in order to reduce the viscosity of the composition before it is used to impregnate the reinforcing material. These methods have suffered from serious drawbacks. In the case of using solvent to reduce viscosity, the solvent must be driven off after the impregnation step, resulting in an additional step in the process as well as unwanted emissions. Moreover, the desired matrix may be insoluble in common solvents. In the case of heating the thermoplastic matrix in order to reduce its viscosity, the dwell time of the resin in the heated zone may result in degradation of the resin with attendant decrease in the desired mechanical properties. Furthermore, the molecular weight of the resin may need to be kept lower than would be desired for properties of the ultimate product in order to facilitate the impregnation step. Finally, as noted above, known processes for impregnating thermoplastic resin into reinforcing materials have required lengthy consolidation of the prepreg materials at high temperatures and pressures in order to develop the best physical strength and other properties and to minimize or eliminate outgassing during the consolidation or in later steps, e.g., finishing processes. Outgassing during consolidation results in voids within the composite that can cause microcracking or premature delamination that may adversely affect mechanical properties; outgassing during coating steps tends to cause pinholing or popping in the substrate or coating, resulting in an undesirably rough and blemished surfaces or finishes.

Cochran et al., U.S. Pat. No. 5,236,646, disclose that a process using vacuum of up to about 28 inches of mercury below atmospheric pressure and temperatures above the melting point of the resin requires a shorter time for consolidation as compared to a process that uses high consolidation pressures of from about 100 to 300 psi. However, the consolidation step still requires a dwell time under vacuum of up to sixty minutes or more.

Because the length of time typically required to properly consolidate the prepreg plies determines the production rate for the part, it would be desirable to achieve the best consolidation in the shortest amount of time. Moreover, lower consolidation pressures or temperatures and shorter times will result in a less expensive production process, for instance due to lowered consumption of energy per piece for molding.

The present invention provides a new process for preparing prepregs, novel prepregs, and articles of reinforced materials that offers significant advantages over the processes described above. In the methods according the present invention, the reinforcing material is heated before being impregnated with the resinous matrix composition. The impregnated roving or tow that is produced according to the present inventive process has substantially no voids and can therefore be quickly and easily formed into a desired article having no voids or essentially no voids without the lengthy consolidation processes necessary for prepregs formed by other processes. In other words, the roving bundle is fully, or substantially fully, wet out. The only process that must take place in forming an article is fusion between impregnated bundles, and it is possible to use temperatures, pressures, and/or times during such forming operations that are significantly reduced over prior art processes.

The present invention also provides a method of making a molded article using the prepreg of the present invention.

BRIEF DESCRIPTION OF THE DRAWINGS

FIG. 2 is a schematic diagram for a preferred apparatus of the invention used in a method of the invention that is demonstrated by Example 3.

FIG. 3 is a schematic diagram for a preferred apparatus of the invention used in a method of the invention that is demonstrated by Example 4.

DETAILED DESCRIPTION

Figure 1:
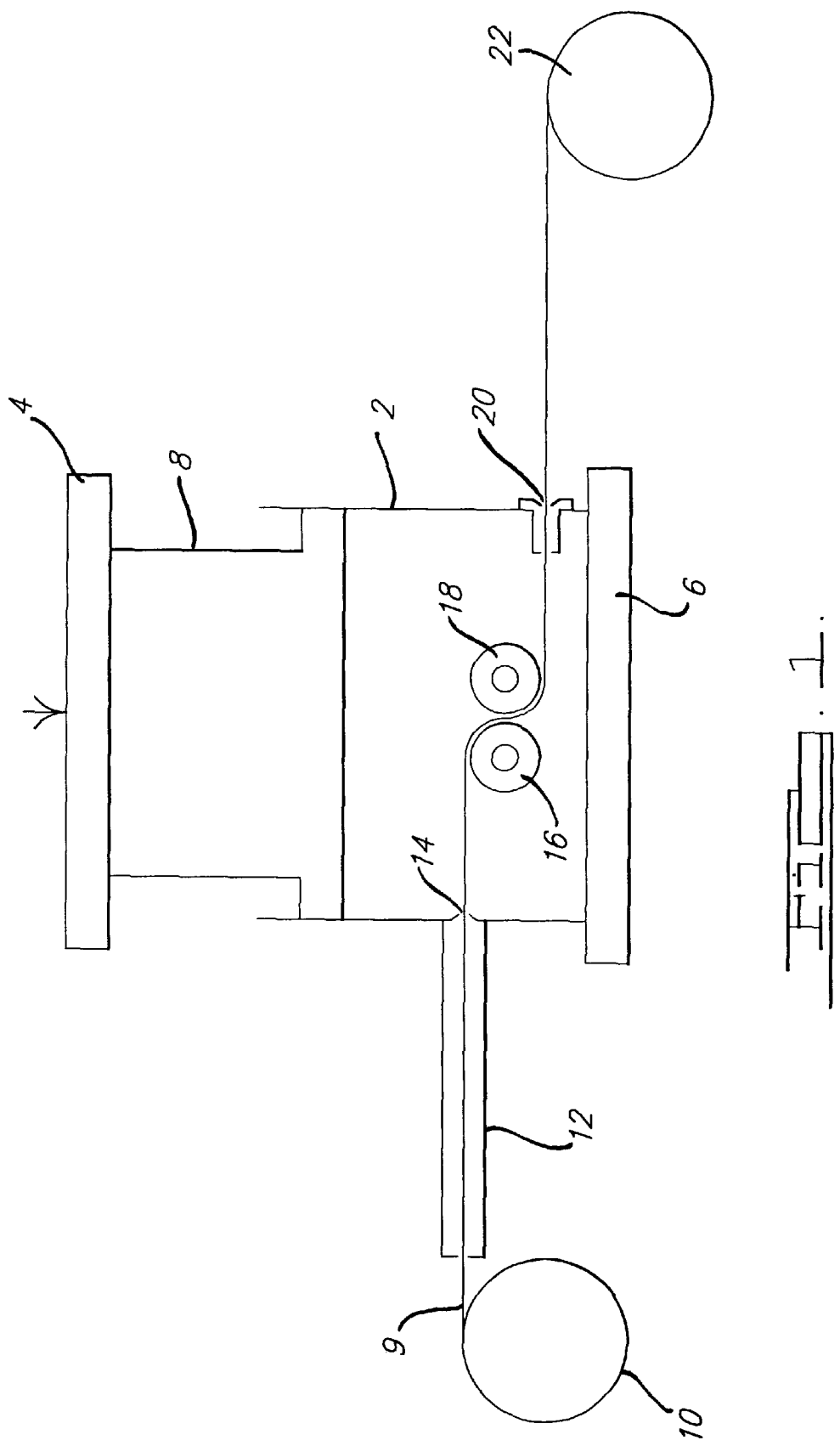
FIG. 1 is a schematic diagram for a preferred apparatus of the invention used in a method of the invention that is demonstrated by Examples 1 and 2.

The process of the invention includes heating the fiber or other reinforcing material; bringing the heated reinforcing material into contact with the matrix resin composition under an applied shear to form a prepreg; and, optionally, further forming the prepreg into a desired shape. The invention further provides a prepreg formed thereby having exceptionally few voids or substantially no voids that can be formed into a desired product more quickly and easily than prepregs that are now known in the art. Presence of voids may be determined or measured by measuring the density of the prepreg or article or by visual observation with the aid of a microscope.

The term "prepreg" as used herein preferably refers to a composite, whether in rod, rope, fiber, roving, strand, tow, sheet, or other form, which comprises a reinforcing fiber or other such substrate impregnated with a matrix composition. The present process is especially useful when the resin is a thermoplastic resin. However, the method of the invention may also be utilized for uncured or partially cured thermoset resins. The present invention is particularly advantageous for thermosetting composition when the viscosity of the composition at the desired processing temperature would otherwise make processing difficult or result in degradation of the resin. For example, the present methods are particularly suitable for so-called "pseudo thermoplastic" materials that exhibit behaviors during prepregging similar to those of true thermoplastic materials. The present inventive processes are also advantageous for heating the reinforcing material to a temperature that will cause partial curing of the thermosetting material when such partial curing is desired before forming the final article. Finally, the invention includes a method of thermoset prepregging for thermosetting compositions having a short "pot life" at the temperature needed to produce a suitable resin viscosity. "Pot life" is a term of art that describes the interval of time after mixing during which a thermosetting composition may be used before it sets up (i.e., before the viscosity build up due to crosslinking makes the composition unworkable).

All types of fiber reinforcements or other reinforcing materials commonly used for these applications may be used in the processes of the invention. It is also possible for a roving bundle or tow to be shaped before being impregnated, for example to be flattened to a tape, or for the reinforcing fiber to be used as a cloth. Useful fibers include, without limitation, glass fibers, carbon and graphite fibers, polymeric fibers including aramide fibers, boron filaments, ceramic fibers, metal fibers, asbestos fibers, beryllium fibers, silica fibers, silicon carbide fibers, and so on. The fibers may be conductive and such conductive fibers, for example conductive carbon fibers or metal fibers, may be used to produce articles for conductive or static charge dissipative applications or EMI shielding.

Glass fibers, in particular, are available in a number of different kinds, including E-glass, ECR-glass (a modified E-glass that is chemically resistant), R-glass, S-glass and S-2 glass, C-glass, and hollow glass fibers. For many applications glass fibers of higher modulus will be preferred; thus, the order of preference among the glass fibers from more preferred to less preferred is S-2, C, R, then E. Commercially available fibers include Nenxtel™ ceramic fiber (from 3M); Vectran™ (from Hoëchst-Celanese); and Hollow-X™ (from Owens-Corning).

The fiber filaments are usually formed into a bundle, called a roving or tow, of a given uniform cross-sectional dimension. The fibers of the bundle are usually all of the same type, although this is not essential to the present method. For a particular impregnating matrix composition, a reinforcement should be chosen that can withstanding the temperatures and shear suitable for producing the desired prepreg. In particular, if a fiber is coated with a sizing or finishing material, the material should be one that is stable and remains on the fiber at the selected processing temperature. A sizing or finishing material, if employed, may be selected and applied according to customary means. Unsized fibers such as carbon are advantageously employed in some applications in order to optimize mechanical properties.

In one preferred embodiment, fiberglass filaments are impregnated with a thermoplastic resin. Fiberglass filaments typically are coated with a sizing and/or finishing material. The sizing material or finishing material used is selected to be able to withstand the temperatures to which the fiberglass is heated during the process. One preferred sizing is Owens Corning 193/933.

The fiber bundle, mat, cloth, or other reinforcing material is heated to a selected temperature above the melting point, softening point, or glass transition temperature ($T_g$) of the impregnating resin matrix composition. (Which of these— melting point, softening point, or $T_g$—a particular composition has depends upon the particular characteristics of the composition, as whether the composition comprises an amorphous or crystalline impregnating resin, but is not critical to the invention.) The temperature to which the fibrous reinforcing material is heated is sufficient to produce a prepreg having no voids or substantially no voids. The temperature to which the fibrous reinforcing material is heated is thus sufficient to cause the impregnating resin to fully or substantially fully wet out the fibrous reinforcing material. In a preferred embodiment of the invention, the reinforcement is heated to at least about 25° F., preferably to at least about 50° F., still more preferably to at least about 75° F., and even more preferably to at least about 100° F. above the melting point, softening point, or $T_g$ of the resin matrix composition; and up to about 500° F, preferably up to about 400° F., particularly preferably up to about 350° F., and even more preferably up to about 300° F. above the melting point, softening point, or $T_g$ of the resin matrix composition. In a preferred embodiment, the reinforcing material is heated to a temperature above about 350° F., and below about 800° F. Some considerations in the choosing a particular temperature to which to heat the reinforcement will be the distance that it must travel through the resin bath, the speed with which it is pulled through the bath, the viscosity of the resin in the bath, and the shear produced at the surface of the reinforcement. Because the length of time to which the matrix resin composition is exposed to such temperature is relatively short, the roving bundle or tow may be heated even to temperatures that might otherwise cause thermal degradation of the matrix resin composition.

The means for heating the fiber is not generally critical, and may be chosen from any number of means generally available for heating materials. Particular examples of such means include, without limitation, radiant heat, inductive heating, infrared tunnels, or heating in an oven or furnace, e.g. an electric or gas forced air oven. Insufficient heating may result in undesirable resin conglomeration at the surface of the roving bundle, tow, or other reinforcement. Thus, the temperature to which the roving bundle is heated should be sufficient to allow the resin to flow between the filaments or fibers to impregnate the roving or tow in a substantially uniform way. The methods of the invention allow the resin matrix composition to impregnate the fiber bundle instead of agglomerating at the surface of the fiber bundle. The particular temperature chosen will depend upon factors that would be obvious to the person of skill in the art, such as the particular type of resin used, the denier of the fiber, and the profile or size of the bundle and can be optimized by straightforward testing according to the ultimate application method. Preferably, the reinforcing material is heated above the temperature of the impregnating matrix composition. In a preferred embodiment of the present process, fiberglass coated with Owens Corning 193/933 sizing is heated to above about 350° F., and below about 800° F.

The matrix resin compositions used in the methods of the invention may be thermoset or, preferably, thermoplastic resin compositions. Virtually any thermoplastic resin suitable for forming into articles by thermal processes, molding, extrusion, or other such processes may be employed in the methods of the invention. For example, and without limitation, the following thermoplastic materials may advantageously be used: acrylonitrile-butadiene-styrene (ABS) resins; acetal resins; acrylics; acrylonitriles (AN); allyl resins; cellulosics; epoxies; polyarylether ketones; polyether etherketones (PEEK); liquid crystal polymers, such as those sold under the tradename Xydar by Amoco Polymers Inc., Atlanta, Ga.; amino resins, including melamine, melamine formaldehyde resins, urea formaldehyde resins, guanidines, and so on; phenolics; polyamides, such as poly(tetramethylene) adipamide and polyphthalamide; polyimides; polyamide-imide resins; polyolefins, such as polyethylene, polypropylene, and polybutylene homopolymers and copolymers; polycarbonates; polyesters, such as polyalkylene terephthalates including, without limitation, polybutylene terephthalate (PBT) and polyethylene terephthalate (PET); polyimides and polyetherimides; polyphenylene oxide; polyarylene sulfites such as polyphenylene sulfite; polyarylene sulfides such as polyphenylene sulfide; polyvinyl resins, including, without limitation, polystyrene(PS) and copolymers of styrene such as styrene-acrylonitrile copolymer (SAN), polyvinyl chloride (PVC), and polyvinylphenylene chloride; polyurethanes; and polysulfones, including, without limitation, polyaryl-ether sulfones, polyether sulfones, and polyphenyl sulfones. The thermoplastic resins may have melting points, softening points, or $T_gS$ ranging up to about 750° F. Mixtures of two or more resins may also be used. Preferred thermoset resin compositions include epoxies that cure with amines, acids, or acid anhydrides and polyesters that cure through unsaturation, as well as bismaleimides, polyimides, and phenolics.

The matrix compositions may include one or more additives, such as impact modifiers, mold release agents, lubricants, thixotropes, antioxidants, UV absorbers, heat stabilizers, flame retardants, pigments, colorants, nonfibrous reinforcements and fillers, plasticizers, impact modifiers such as ionomers or maleated elastomers, and other such customary ingredients and additives. In the case of a thermoset resin composition, a catalyst or initiator for the curing reaction may advantageously be included.

The apparatus of the invention includes a heater for heating the fibrous reinforcing material and a container in which the molten impregnating resin composition is disposed. The container has an inlet through which the fibrous reinforcing material enters the container and an outlet through which the fibrous reinforcing material exits the container. The heater is located so that it can provide the fibrous reinforcing material to the inlet to the container with the fibrous reinforcing material being at a temperature that is sufficient to produce a prepreg having no voids or substantially no voids. The temperature to which the fibrous reinforcing material is heated is thus sufficient to cause the impregnating resin to fully or substantially fully wet out the fibrous reinforcing material. In particular, the heater is one that is capable of heating the reinforcing material to a temperature above the temperature of the molten matrix resin, and, preferably, the heater is one that is capable of heating the reinforcing material to a temperature of above about 350° F. and up to about 800° F., as measured at the inlet of the container. While in the container, the fibrous reinforcing material passes through a shearing mechanism. The container may be, for example, a tank, an extruder, an impregnation die, or any other container of suitable size to accommodate both the resin and the fibrous reinforcing material and to provide the shearing mechanism. For example, the container may be a tank having as an inlet a tapered die, as an outlet a sizing die, and as a shearing mechanism a pair of shear pins. The container may further comprise an opening through which pressure is applied to the molten resin, for example by a piston. In another example, the container may be an impregnation die, having an inlet for a fiber, an inlet for resin, a pair of die shear pins through which the fiber is pulled, and an outlet. Optionally, the apparatus of the invention further includes molding equipment for forming the prepreg into an article of a desired shape.

In one aspect of the invention, the heated roving bundle is moved through a bath of molten impregnating matrix resin composition, preferably with a shear sufficient to aid in the flow of the resin into the roving bundle. Shear may be created by moving a roving across two displaced and opposing pins located in the matrix resin bath. Shear force may be created by applying tension to the fiber or roving bundle while the fiber or roving bundle is passing over and around these pins. Greater shear may be created by increasing the separation of the pins or by increasing the tension on the creel, for example with the aid of a magnetic brake. In general, the shear should be increased when the viscosity of the resin increases. In a preferred embodiment, the fibers are heated to a temperature approaching the degradation temperature of the resin. At higher temperatures, the viscosity of the resin that comes into contact with the heated fiber is minimized and, consequently, the shear required to move the fiber through the resin is minimized.

After the fibers of the roving or tow have cooled to approximately the temperature of the matrix resin bath, the amount of resin adhering to the exterior of the bundle may be increased or decreased in order to achieve a desired ratio of resin to fiber for the impregnated bundle. In particular, the impregnated roving bundle may be fed through a shearing mechanism at a rate that will allow laminar flow of the resin, and then through a sizing die, in order to give the roving or tow its final desired shape and resin percentage. The roving or tow may then be wound onto creels, chopped into strands of a desired length, for example at least about 3 mm in length, and up to about 76 mm in length, or used immediately in a pultrusion or forming operation. A tape or cloth may also, for example, be wound onto a creel for use in a later forming process.

The apparatus of the invention, in another embodiment, includes a heater for heating the fibrous reinforcing material and a compressing unit for pressing the heated fibrous reinforcing material together with a solid body of a matrix resin composition. The heater is located so that it can provide the fibrous reinforcing material to the compressing unit with the fibrous reinforcing material being at a temperature that is sufficient to produce a prepreg having no voids or substantially no voids. The temperature to which the fibrous reinforcing material is heated is thus sufficient to cause the impregnating resin to fully or substantially fully wet out the fibrous reinforcing material. In particular, the heater is one that is capable of heating the reinforcing material to a temperature above the melting point, softening point, or glass transition temperature of the matrix resin, and preferably a temperature above about 350° F. and up to about 800° F., as measured at the point where the reinforcing material enters the compressing unit.

A mat or sheet may be preheated as described and then compressed with the matrix resin composition into a sheet of laminate. Sheet molding compounds may be produced according to this variation of the present process.

In general, the prepregs of the invention may comprise from at least about 1% by weight resin, and up to about 150% by weight resin, based upon the weight of the fiber.

The preferred ranges of the weight of resin included in the prepreg will depend upon the specific resin and reinforcing material used, as well as upon the desired properties and use of the article to be formed by the process. Optimum ratios of resin to fiber may be determined according to known methods. In a preferred embodiment, the resin is at least about 25% by weight, and up to about 75% by weight, based upon the weight of the reinforcing fiber.

The preferred impregnated roving or tow produced according to the inventive methods may be described as a "fully impregnated" roving or tow; that is, the interface between the fibers and the resin is substantially free of voids. An impregnated fiberglass roving, for example, has a set and uniform dimension with a given amount of thermoplastic resin matrix. This impregnated roving can be molded quickly into a finished part having substantially no voids and having excellent properties without the need for a lengthy or rigorous consolidation step. Thermoplastic composite matrices are preferred over thermoset matrices when properties of toughness, capacity for recycling and/or reforming and/or post-forming of the piece, resistance to UV degradation, or other specific properties available in thermoplastic mediums are required.

It is known in the art that the properties developed in the final article are dependent upon the impregnation process and the consolidation and other fabrication steps following impregnation. This is particularly true for high viscosity thermoplastics that are impregnated neat (that is, without including solvent). The prepregs produced according to the methods of the invention have uniform dimensions, homogenous distributions of the impregnated resin, and are preferably essentially free of voids.

The impregnated fibers of the invention may be used as unidirectional, woven (e.g., fabric), or random (chopped) materials. The fibers may be used as unidirectional tows, such as those of 3000, 6000, and 12,000 filaments per tow that are usual in the industry, typically of lengths up to about 1000-m (3000-foot). The fibers may also be formed into unidirectional tapes, such as tapes having the typical dimensions of 150-mm (6-inch) or 300-mm (12-inch) widths and lengths of up to 50 m (150 feet). Tapes typically range from about 80 g/m$^2$ to about 190 g/m$^2$, and a typically 0.125 mm (5 mils) thick. Prepreg unidirectional tow may optionally be woven into a fabric.

The prepreg of the invention is cut or trimmed to a desired shape. Plies can be trimmed from a prepreg roll into the desired shape, size, and orientation by means of any cutting device known in the art. Plies can be stacked by hand or by machine in what is known in the art as a lay-up operation.

Continuous directional fibers may be formed by compression molding, filament winding, pultrusion, or combinations of these processes. Compression molding is usually employed for forming complex shapes and is used in a preferred embodiment of the invention.

The assembled plies may be consolidated using heat or a combination of heat with either pressure or vacuum for a period of time sufficient to consolidate the plies. The time of consolidation is preferably from about 1 minute to about 20 minutes at a temperature preferably greater than the melting point, softening point, or $T_g$ of the resin matrix, preferably at least 20° C. above the melting point, softening point, or Tg of the resin, and particularly preferably above about 20° C., and below about 100° C. above the melting point, softening point, or Tg of the resin. Optionally, additional resin may be added to help bind or ply the tows together, particularly in a pultrusion process.

A typical pultrusion process involves thermal shaping and, in the case of a thermoset composition, optional curing of the prepreg. Pultrusion is an automated process for manufacturing composite materials into linear, continuous profiles having constant cross-sections. Typically, the pultrusion process begins with reinforcing fibers that are strung from creels at the beginning of the equipment to pullers at the end. The fibers typically pass through a resin bath where they are impregnated with resin. The resin impregnated fibers are continuously pulled through a die that typically has both cooling and heating zones to fashion the final shape of the profile. The heating zone may partially cure a thermosetting resin. The pullers continuously pull the profile toward a flying cutoff saw that cuts the pultruded composite into the desired lengths.

The prepreg may be formed into articles according to any of the methods known in the art. For example, a compression molding or vacuum molding process may be used. Other processes, such as injection molding, thermoforming, blow molding, calendering, casting, extrusion, filament winding, laminating, injection molding, rotational or slush molding, transfer molding, lay-up or contact molding, or stamping may be used with the impregnated materials formed by the present methods.

The methods of the invention may be used to form many different kinds of useful articles. Examples of such articles include, without limitation, air bag canisters, bumper beams, frame cross members, high strength brackets, leaf springs, seat frames, skid plates, torsion bars, wiper arms, fencing, gears, highway reinforcing rod, pipe hangers, power line cross arms, boat trailers, outboard engine cowlings, bow limbs, car top carriers, and horse shoes. The inventive methods and novel prepregs may be advantageously used to form any article that might be formed using previously known prepregs and methods.

The invention is illustrated by the following examples. The examples are merely illustrative and do not in any way limit the scope of the invention as described and claimed. All parts are parts by weight unless otherwise noted.

EXAMPLE 1

Referring now to FIG. 1, 1 kg of amorphous nylon resin (Grivory 21, available from EMS-American Grilion Inc., Sumpter, SC) is charged to resin tank 2 between heated platens 4 and 6. The resin is heated to about 465° F. under a pressure of about 28 psi applied from piston 8. A roving of S2 glass (750 yield, 933 sizing, available from Owens Corning, Corning N.Y.) is pulled from a creel 10 and through an 18 inch radiant heat tube 12, the tube being heated to a temperature of about 595° F. Exiting the heat tube, the roving is passed through a tapered fiber inlet die 14, over and around two 0.3 inch radius shear pins 16 and 18 heated to 495° F. and positioned about one inch apart horizontally and about 1.5 inches apart horizontally in the resin bath, and finally through a sizing die 20 located opposite the inlet die. The sizing die has a rectangular cross section with a dimensions of 0.25 in.×0.009 in. The hot fiber is pulled at a rate of about 42 ft/min. through the bath. The resulting impregnated tow is 0.25 in. wide, 0.0095 in. thick, and has no measurable air void content. The impregnated tow is wrapped onto a flat 2-bar rotating creel 22. Forty-nine wraps, 2 in. wide, are made on the creel. The wound creel is then place into a pre-heated tool at 480° F. and 200 psi for 8 minutes. The tool is then quenched. The resulting part is 18 inches long, 2 inches wide, and 0.175 inch thick with no measurable void content.

EXAMPLE 2

A tow of S2 glass (750 yield, 933 sizing, available from Owens Corning, Corning N.Y.) is impregnated with amorphous nylon resin (Grivory 21, available from EMS-American Grilion Inc., Sumpter, S.C.) using the same procedure described in Example 1, except that the resulting impregnated tow is sized to 0.25 in. wide and 0.011 in. thick. The impregnated tow has a resin content of 54% by weight. The impregnated tow is chopped into three-inch section. The chopped impregnated tow, 713.25 grams, is placed into a 10 in.×18 in. tool that is preheated to 515° F. and is pressurized to 300 psi for 8 min. The tool is then quenched. The resulting part weighs 653 grams and has an average thickness of 3.82 mm.

EXAMPLE 3

A woven S2 fiberglass cloth with Owens Corning 933 sizing is impregnated with the same amorphous nylon resin and is used in Examples 1 and 2. The fiberglass cloth has the following parameters: FDI Style #1406 (a designation of Fabric Development Corporation, Quakertown, Pa.); yarn type, S2 glass 75 1/0, 933A; weave, 8 harness satin; count, 120×30; width, 39.25 in.; weight, 11.74 oz per square yard; and thickness, 0.0017 in. as measured at 1 psi.

The nylon is extruded into a film 0.0045 in. thick and placed on a creel. The S2 cloth is also on a creel.

Referring now to FIG. 2, the nylon film 24 is pulled from creel 26 and the glass cloth 28 is pulled from creel 30. The glass cloth is pulled through a radiant heater 32. The radiant heater heats the fiber to 600° F., while a reinforced Teflon® sleeve 34 on top of the heater carries the film. Heat escaping from the heater raises the temperature of the film to between 425 and 475° F. The cloth and the film are then fed into two pair of 36-inch compaction rollers 35 and 36. The compaction rollers are covered with Teflon® and two inches of silicone rubber. The rollers exert a force of from 700 to 800 psi on the film and cloth. The impregnated cloth is taken up on creel 38.

The impregnated cloth is cut into sections 10 in.×18 in. Eight plies are then stacked into a preheated (525° F.) tool and compressed at 300 psi for 12 minutes. The tool is then quenched. The resulting laminate is uniform and 0.128 in. thick.

Parts prepared according to the procedures in the above Examples 2 and 3 were tested for physical properties with the following results.

|  | Example 2 | Example 3 |
| --- | --- | --- |
| Tensile Stress (ksi) | 32.81 | 134.8 |
| Young's Modulus for Tensile Stress (Msi) | 2.001 | 6.253 |
| Loss on Ignition (LOI) | 58.752 | 31.894 |
| Glass Content (wt %) | 41.246% | 68.106 |
| Compressive Stress (ksi) | 46.74 | 90.43 |
| Young's Modulus for Compressive Stress (Msi) | 2.088 | 7.271 |

EXAMPLE 4.

A polyethylene terephthalate, glycol addition resin (melt temperature=195.8° F., available from Eastman Chemical Co., Kingsport, Tenn.) is impregnated into a warp unidirectional fabric (Style A130A from Knytex). The fabric has a silane chemistry finish with a polyester stitch in the weft direction. The prepregging procedure of Example 3 is followed, except that the fiber is heated only to 425° F. The prepreg is cured into sheets 10 in.×18 in. Eighteen plies are stacked into a heated mold and compressed at 200 psi for ten minutes. The tool is then quenched and the laminate panel is removed from the tool.

The panel was evaluated using a 3-point flexure test. The mean values for properties measured on five samples were:

| | |
| --- | --- |
| Displacement at Max. Load | 0.1807 in. |
| Maximum Load | 875.7 lb. |
| Stress at Max. Displacement | 112.9 ksi |
| Load Modulus | 5.370 Msi |

EXAMPLE 5.

Referring now to FIG. 3, an amorphous nylon matrix resin (Grivory 21, available from EMS-American Grilion Inc., Sumpter, S.C.) was fed into extruder 40 from hopper 42. The extruder was a Prodex one-inch extruder having a variable drive. The resin was melted in the extruder in a first zone at 485° F. and a second zone at 500° F., with the extruder turning at a rate of 40 rpm. The molten resin was forced into an impregnation die 44 having three heating zones.

Separately, a tow of S2 glass 46 (750 yield, 933 sizing, available from Owens Corning, Corning N.Y.) is pulled from a creel 48 and through a ThermCraft Tube Furnace 50 (Model 21.512-1ZH), the tube being heated to a temperature of about 850° F. Exiting the heat tube, the fiber is threaded through the impregnation die, entering through an inlet die 52 with an opening of 0.25 inch by 0.007 inch and exiting through a sizing die 54 with an opening of 0.25 inch by 0.009 inch.

The impregnation die face was heated to 510° F. and the resin delivery channel 56 was heated to 520° F. Die shear pins 58 in the impregnation die were heated to 535° F. The impregnation die had a surface temperature of 625° F.

The hot fiber was pulled at a rate of about 44 ft/min. through the impregnation die. The resulting impregnated tow was 0.25 inch wide, 0.009 inch thick, had a resin content of 46.78% by weight, and glass content of 53.21 and had no measurable air void content. The impregnated tow was wound onto a frame 60 having a width of 6 inches and a length of 20 inches with 175 wraps. The lay-up was then place into a mold heated to 518° F. and compressed under 200 psi for 10 minutes, then quickly cooled to room temperature. The resulting composite panel had an average thickness of 0.132 inches and no measurable void content. The mechanical properties of the panel were measured with the following results.

ASTM D695-90 Compressive Properties of Rigid Plastics Method 7, width 0.5 in., thickness 0.13 in.

| | |
| --- | --- |
| Load at Maximum (lbs.) | 4562 |
| Stress at Maximum (ksi) | 70.0 |
| % Strain at Maximum | 2.497% |
| Seg. Mod. 10–40% Maximum Load (psi * $10^6$) | 2.535 |
| Displacement at Maximum (in.) | 0.025 |

ASTM D638 Tensile Strength
Method 37, width 0.5 in., thickness 0.13 in.

| | |
|---|---|
| Load at Maximum (lbf) | 3152 |
| Stress at Maximum (psi * $10^3$) | 48 |
| % Strain at Maximum | 0.893% |
| Seg. Mod. 15–40% of Maximum Load (psi * $10^6$) | 4.856 |
| Young's Modulus 15–40% (manually measured) (psi * $10^6$) | 5.128 |
| Young's Modulus 15–40% (automatic) (psi * $10^6$) | 5.753 |

ASTM D790 Flexural Strength
Method 14, width 0.974 in., thickness 0.145 in.

| | |
|---|---|
| Load at Yield (Maximum Load) (lb.) | 695 |
| Stress at Yield (Maximum Load) (psi * $10^3$) | 121 |
| Strain at Yield (Maximum Load) (in./in.) | 0.032 |
| Displacement at Yield (Maximum Load) (in.) | 0.21 |
| Seg. Mod. 15–40% of Maximum Load (psi * $10^6$) | 3.897 |
| Young's Modulus 15–40% of Maximum Load (manually measured) (psi * $10^6$) | 4.192 |
| Young's Modulus (automatic) (psi * $10^6$) | 4.105 |

ASTM D2344 NOL Short Beam Shear Strength
Method 3, span 0.675 in., width 0.26 in., depth 0.143 in.
Load at Yield (Maximum Load) (lb.) 452
Laminar Shear Strength (psi*$10^3$) 9.1

The invention has been described in detail with reference to preferred embodiments thereof. It should be understood, however, that variations and modifications can be made within the spirit and scope of the invention and of the following claims.

What is claimed is:

1. The process for preparing a prepreg material, comprising the steps of:
   (a) heating a fibrous reinforcing material to a first temperature;
   (b) pulling said heated reinforcing material through a molten resin composition at a second temperature, wherein the first temperature Is greater than said second temperature; and
   (c) applying a shear to the reinforcing material at a point when the reinforcing material is in the molten resin composition,
   whereby a prepreg material having substantially no voids is formed.

2. The process for preparing a prepreg material, comprising the steps of:
   (a) heating a fibrous reinforcing material to a first temperature;
   (b) pulling said heated reinforcing material through a molten thermoplastic resin composition at a second temperature, wherein the first temperature is greater than said second temperature; and
   (c) applying a shear to the reinforcing material at a point where the reinforcing material is in the molten resin composition,
   whereby a prepreg material having substantially no voids is formed.

3. The process for preparing a prepreg material, comprising the steps of:
   (a) heating a fibrous reinforcing material comprising a high silica glass fiber to a first temperature;
   (b) pulling said heated reinforcing material through a molten resin composition at a second temperature, wherein the first temperature is greater than said second temperature; and
   (c) applying a shear to the reinforcing material at a point where the reinforcing material is In the molten resin composition,
   whereby a prepreg material having substantially no voids is formed.

4. The process for preparing a prepreg material, comprising the steps of:
   (a) heating a fibrous reinforcing material to a first temperature;
   (b) pulling said heated reinforcing material through a molten resin composition at a second temperature, wherein the first temperature is greater than said second temperature, and further wherein the first temperature is from about 10° F. to about 300° F. above the melting point, softening point, or glass transition temperature of the resin composition; and
   (c) applying a shear to the reinforcing material at a point where the reinforcing material is in the molten resin composition,
   whereby a prepreg material having substantially no voids is formed.

5. The process for preparing a prepreg material, comprising the steps of:
   (a) heating a fibrous reinforcing material to a first temperature of from about 350° F. to about 800° F.;
   (b) pulling said heated reinforcing material through a molten resin composition at a second temperature, wherein the first temperature is greater than said second temperature; and
   (c) applying a shear to the reinforcing material at a point where the reinforcing material is in the molten resin composition,
   whereby a prepreg material having substantially no voids is formed.

6. The process for preparing a prepreg material, comprising the steps of:
   (a) heating a fibrous reinforcing material to a first temperature;
   (b) pulling said heated reinforcing material through a molten resin composition at a second temperature, wherein the first temperature Is greater than said second temperature; and
   (c) applying a shear to the reinforcing material at a point where the reinforcing material is in the molten resin composition,
   whereby a prepreg material having substantially no voids is formed, wherein the resin composition comprises at least one resin selected from the group consisting of ABS, acrylics, acrylonitriles, epoxies, polyarylether ketones, polyether etherketones, amino resins, phenolics, polyamides, polyimides, polyolefins, polycarbonates, a polyesters, polyetherimides, polyarylene sulfides, polyvinyl resins, polyurethanes, polysulfones, copolymers of these, and mixtures thereof.

7. A process for preparing a prepreg material, comprising the steps of:
   (a) heating a fibrous reinforcing material to a first temperature;
   (b) pulling said heated reinforcing material through a molten resin composition at a second temperature, wherein the first temperature is greater than said second temperature;

(c) drawing the prepreg material through a shearing mechanism at a point where the reinforcing material is in the molten resin composition, whereby a prepreg material having substantially no voids is formed.

8. The process for preparing a prepreg material comprising the steps of:

(a) heating a fibrous reinforcing material to a first temperature;

(b) pulling said heated reinforcing material through a bath of molten resin composition at a second temperature, wherein the first temperature is greater than said second temperature; and (c) pulling the reinforcing material over shear pins at a point where the reinforcing material is in the molten resin composition, whereby a prepreg material having substantially no voids is formed.

9. The process according to claim 1, wherein the reinforcing material is a filament bundle.

10. The process according to claim 1, wherein the reinforcing material comprises a material selected from the group consisting of glass fibers, carbon fibers, graphite fibers, polymeric fibers, aramide fibers, and mixtures thereof.

11. The process according to claim 1, wherein the reinforcing material is coated with a sizing or finishing material.

12. The process according to claim 1, wherein the first temperature is from about 25° F. to about 500° F. above the melting point, softening point, or glass transition temperature of the resin composition.

13. The process according to claim 12, wherein the first temperature is from about 50° F. to about 400° F. above the melting point, softening point, or glass transition temperature of the resin composition.

14. The process according to claim 12, wherein the first temperature is from about 75° F. to about 350° F. above the melting point, softening point, or glass transition temperature of the resin composition.

15. The process according to claim 5, wherein the reinforcing material comprises a high silica glass fiber coated with a sizing.

16. The process according to claim 15, wherein the resin composition is thermoplastic.

17. The process according to claim 1, wherein the resin composition comprises at least one thermosetting resin selected from the group consisting of epoxies, polyesters, and phenolic resins.

18. The process according to claim 1, further including a step of pressurizing the resin composition.

19. The process according to claim 1, further including a step of drawing the prepreg material through a sizing die.

20. The process according to claim 1, further including a step of pressing the prepreg material between rollers.

21. The process according to claim 1, further including a step of forming the prepreg into a desired shape.

22. The process according to claim 21, wherein the prepreg is formed by a method selected from the group consisting of lay-up, compression molding, injection molding, thermoforming, blow molding, calendering, extrusion, casting, laminating, filament winding, rotational molding, transfer molding, stamping, and pultrusion operations, and combinations thereof.

23. The process according to claim 1, comprising a step of pulling the heated reinforcing material though a bath of the molten resin composition and over shear pins in thebath.

24. The process according to claim 8, wherein tension is applied to the fibrous reinforcing material.

25. The process according to claim 8, wherein the prepreg material is chopped into lengths of from about 3 mm to about 76 mm after exiting the bath.

* * * * *

UNITED STATES PATENT AND TRADEMARK OFFICE
CERTIFICATE OF CORRECTION

Page 1 of 2

PATENT NO. : 5,911,932
DATED : June 15, 1999
INVENTOR(S) : Joel A. Dyksterhouse

It is certified that error appears in the above-identified patent and that said Letters Patent is hereby corrected as shown below:

Column 12, line 10, "The" should be -- A --.

Column 12, line 18, "10°F." should be -- 100°F. --.

Column 12, line 26, "The" should be -- A --.

Column 12, line 39, "The" should be -- A --.

Column 12, line 46, "Is" should be -- is --.

Column 12, line 56, delete "a".

Column 13, line 6, "The" should be -- A --.

Column 14, lines 27-29, delete -- 23. The process according to claim 1, comprising a step of pulling the heating reinforcing material though a bath of the molten resin composition and over shear pins in thebath. --.

UNITED STATES PATENT AND TRADEMARK OFFICE
CERTIFICATE OF CORRECTION

PATENT NO.   : 5,911,932
DATED        : June 15, 1999
INVENTOR(S)  : Joel A. Dyksterhouse It is certified that error appears in the above-identified patent and that said Letters Patent is hereby corrected as shown below:

Column 14, line 30, insert -- 23. The process according to claim 21, including a further step of consolidating the prepreg for a period of from about 1 minute to about 20 minutes. --.

Signed and Sealed this

Seventh Day of December, 1999

*Attest:*

Q. TODD DICKINSON

*Attesting Officer*

Acting Commissioner of Patents and Trademarks